United States Patent

Tsui

[11] Patent Number: 6,036,155
[45] Date of Patent: Mar. 14, 2000

[54] CORNER BUMPER FOR USE ON MOVABLE OBJECTS

[76] Inventor: Jones Tsui, 1130 Front St., Alhambra, Calif. 91803

[21] Appl. No.: 08/939,045

[22] Filed: Sep. 26, 1997

[51] Int. Cl.⁷ .................................................... A47B 95/00
[52] U.S. Cl. ......................................................... 248/345.1
[58] Field of Search .......................... 248/345.1; D8/403

[56] References Cited

U.S. PATENT DOCUMENTS

| | | | |
|---|---|---|---|
| D. 35,089 | 9/1901 | Child | D8/403 |
| D. 221,958 | 9/1971 | Finebaum | D8/403 |
| D. 231,430 | 4/1974 | Steinhauser | D8/382 |
| D. 246,625 | 12/1977 | Becker, III | D8/403 |
| D. 260,590 | 9/1981 | Hobson | D8/403 |
| D. 302,789 | 8/1989 | Levine | D8/403 |
| D. 356,946 | 4/1995 | Rekuc | D8/403 |
| D. 412,436 | 8/1999 | Tsui | D8/403 |
| 2,685,147 | 8/1954 | Burr | 248/345.1 |
| 4,072,231 | 2/1978 | Helms | 206/453 |
| 4,742,916 | 5/1988 | Galea | 248/345.1 |
| 4,903,686 | 2/1990 | Jennings | 248/345.1 |
| 5,363,617 | 11/1994 | Miller | 248/345.1 |
| 5,639,072 | 6/1997 | McCall | 248/345.1 |

*Primary Examiner*—Anita M. King
*Attorney, Agent, or Firm*—Robert J. Schaap

[57] ABSTRACT

A unique corner bumper for use on movable objects and particularly on movable vehicles, such as trucks and truck trailers, to protect a fixed or stationary object, such as a building or other rigid structure, against the force of an impact by the movable object. The corner bumper has a pair of elongate sections integrally connected together at common ends and which elongate sections have generally perpendicularly arranged interiorly presented surfaces and an upper interiorly presented surface of a top wall which is also perpendicularly disposed to the interiorly presented surfaces of the side walls. In this way, the bumper will fit over an upper or lower corner portion of a truck trailer, for example. The bumper has tapered exteriorly presented side wall surfaces so that it is generally resistant to being sheared off of the movable object in the event of an impact with a stationary structure or, for that matter, another movable object which engages the bumper in a shearing position, as on an end portion thereof. Moreover, the corner bumper is provided with interiorly formed openings thereby effectively creating ribs between the openings in the structure which are capable of at least partially collapsing or compressing upon impact with a stationary structure. The compressibility of the bumper protects the stationary structure against damage from a vehicle or other movable object impacting against the stationary structure when the bumper is used on that vehicle or other movable object.

21 Claims, 6 Drawing Sheets

CORNER BUMPER FOR USE ON MOVABLE OBJECTS

BACKGROUND OF THE INVENTION

1. Field of the Invention

This invention relates in general to certain new and useful improvements in corner bumpers used on movable objects for protecting stationary structures against impact by the movable object and, more particularly, to corner bumpers of the type stated which are uniquely shaped so as to preclude shearing of the bumper from the movable object if the bumper is engaged on an end portion thereof, and which also is uniquely designed with interior openings and ribs so as to be collapsible or compressible for absorbing the force of an impact.

2. Brief Description of Related Art

Automotive vehicles, such as passenger automotive vehicles, and, for that matter, truck tractors are sometimes equipped with bumpers to preclude damage to a fixed structure, or otherwise, a stationary structure, upon engagement with that fixed or stationary structure, such as a building or a parked vehicle. In many cases, however, portions of a vehicle are not equipped with bumpers, as for example, the upper portions of a truck and trailer and, particularly, the rear portion of a trailer which may be backed-up toward a fixed building structure. If the trailer should contact that fixed or other stationary structure, damage would result not only to the fixed or stationary structure, but potentially to the trailer, as well.

The damage to a fixed structure can result in a serious interruption to a business operation, particularly if the portion of the fixed structure engaged was a door, such as an overhead door. The damage to the door may cause the latter to be unopenable or closable, thus interfering with the normal business operation. In other cases, the damage could be to the actual building structure, thus necessitating costly repair. The same holds true with regard to the truck trailer in that substantial cost is not only required for repair of the trailer, but there is also the concomitant down-time in the use of the trailer. The same problem exists with other type of vehicles, such as single body utility vehicles, as well.

The same problem often occurs with utility trucks in various locations and, particularly, in airport environments. Frequently, after an aircraft and, particularly, a passenger aircraft or freight aircraft, reaches a parking area, several trucks are driven to that location in order to service the aircraft. Since the fuselage of the aircraft has a generally curved side walk, it is oftentimes difficult for a utility truck driver to properly estimate the distance of the rear of that truck to the aircraft. Consequently, impacts can readily arise with resultant damage to the aircraft.

Even a slight dent in the fuselage of an aircraft can constitute serious damage inasmuch as it will interfere with the aerodynamics of the aircraft. Thus, any type of impact usually results in damage which, in turn, causes the necessity of repair. It may be appreciated that when the aircraft is in a state of repair, it is not being used and, hence, there is a substantial revenue loss with any type of impact.

Damage resulting from impact with a sharp corner on a movable object, such as a truck trailer, can be particularly pronounced and it is therefore desirable to protect against this type of damage. There have been certain proposed corner protectors, or so-called "corner bumpers", which have been offered for use on movable objects. The only moderately partially effective corner protector which has been made available is one which is inflatable and uses air as a collapsible medium allowing the corner bumper to absorb the force of an impact.

This commercially available corner protector comprises a pair of arms or elongate sections which are integrally connected to one another at common ends and includes a top wall to engage the corner of a truck trailer or otherwise the rear portion of a utility truck. Moreover, the interior of the elongate members is hollow and provided with a means to fill sealed pockets with air, much in the nature of a balloon.

As may be anticipated, these commercially available bumpers only have a limited life span and, even though they may be formed of a relatively durable material, they can rupture upon sufficient impact, or otherwise, allowing an escape of the air cushion. In addition, and after a reasonable period of time, they will become brittle and crack, again leading to a lose of the air cushion and thereby become relatively ineffective and incapable of performing their intended function.

As may be anticipated, these commercially available bumpers can often times create damage by their very presence. If the air pocket should leak for some reason as, for example, by a small crack which is not readily observable, the driver of the vehicle may reasonably believe that the corner protector is effective to protect against any impact, and thereby use less caution or care in the maneuvering of the vehicle. However, when the air pocket is eliminated, the corner bumper provides little or no protection against the force of an impact. In this case, the corner bumper is ineffective.

There has been another proposed corner bumper which utilizes a plurality of outwardly projecting elements, such as fingers, on the exterior surface thereof and which are designed to either deflect or compress upon engagement with a fixed or stationary structure upon contact. These outwardly projecting elements are closely spaced apart from one another. However, these outwardly projecting fingers, even though formed of a moderately thick and durable rubber material, do not effectively absorb the force of an impact and, frequently, will break off of the bumper, thereby again interfering with its function and operation. In addition, the fingers can also push in the skin of an aircraft fuselage or cause damage to another stationary structure upon impact under certain circumstances.

Heretofore, there has not been any effective corner bumper arrangement for use on a movable object, such as a vehicle, to protect against impact with a fixed or stationary structure. However, there has been a substantial need for such a bumper arrangement.

OBJECTS OF THE INVENTION

It is, therefore, one of the primary objects of the present invention to provide a corner bumper for use on movable objects to protect a fixed or stationary structure against impact by that movable object and to also protect the movable object itself from impact with a fixed or stationary structure.

It is another object of the present invention to provide a corner bumper of the type stated which is formed of a durable plastic material having interior voids and compressible ribs to absorb the force of an impact.

It is a further object of the present invention to provide a corner bumper of the type stated which can be adapted for use on a wide variety of objects and, particularly, for use on vehicles of different sizes and shapes.

It is an additional object of the present invention to provide a corner bumper of the type stated which can be made of a relatively durable plastic material at a relatively low cost and which is uniquely designed so that it will withstand the abuse of impacts in the event of an accident and also will be sufficiently resilient to return to its original condition after an impact.

It is also an object of the present invention to provide a corner bumper of the type stated which is uniquely designed to reduce the possibility of shearing a corner bumper from a secured position on a movable object in the event of impact in which a shear force is applied to the corner bumper.

It is another salient object of the present invention to provide a corner bumper of the type stated for use on movable objects and which is highly efficient in its operation and can be made at a relatively low cost, and which is easily attachable to and removable from, a movable object.

With the above and other objects in view, my invention resides in the novel features of form, construction, arrangement and combination of parts presently described and pointed out in the claims.

BRIEF SUMMARY OF THE INVENTION

The present invention relates primarily to a corner bumper adapted for use on movable objects and, more particularly, for use on movable objects in the nature of vehicles and which include, for example, truck tractors, truck trailers, single unit trucks, boats and the like. Preferably, the corner bumpers are designed for use on the corners of such movable objects but they are also effective for use on other edge portions of an object.

The corner bumpers of the present invention are designed to prevent damage to a stationary structure upon impact of the vehicle or other movable object with that stationary structure. However, by their very nature, the corner bumpers will also protect the movable object as well. In this case, and as stated above, the movable object may adopt the form of a vehicle. The term "stationary structure" is used in a broad sense to refer to any structure which nay be in a stationary position when engaged by a movable object. Thus, for example, an airplane is normally a moving object. However, when parked at an airport hangar, it is temporarily a stationary or a fixed structure since it is parked and non-moving.

The corner bumper of the invention is unique in that it reduces the possibility of a shearing action on the bumper which might otherwise cause a removal of the corner bumper from a secured position on a utility truck or other vehicle. The bumper is uniquely designed so that its outer edges are relatively thin. As a result, any impact in the region of an edge of the bumper would likely avoid that edge and engage the greater surface area of the exterior side wall of the bumper, thereby precluding an actual shearing action. Moreover, the exterior side walls of the bumper are actually shaped with a proper taper from the outer edge to the corner portion so that they actually reduce the likelihood of any shearing of the corner bumper from a secured position on a vehicle or other movable object.

The corner bumper of the present invention is also designed primarily for use on the corner of a movable object as, for example, on the corner of a utility truck or on the corner of a truck trailer, such as the rear corner thereof. However, it should be understood that the present invention also contemplates the use of a corner bumper on edges of vehicles as, for example, along an edge where two side walls of a truck trailer meet, but not necessarily at the corner thereof. In this case, omission of the top wall would serve that function.

The corner bumper of the present invention is uniquely designed to prevent impact and resulting damage to a stationary structure. The corner bumper comprises a first elongate section having a first interiorly presented wall and first exteriorly presented wall. The bumper also includes a second elongate section connected to an end of the first elongate section and also has a second interiorly presented wall and a second exteriorly presented wall. The ends of the elongate sections which are connected together at a corner portion are preferably integrally formed together so that the two elongate sections constitute a single unit. The opposite ends, that is the unconnected ends of the elongate sections, are generally free ends, but which are tapered to relatively thin edges so as to reduce the possibility of a shearing action, as previously described.

In order to fit upon a rectangularly shaped corner portion of a vehicle, the first and second interiorly presented walls are located at a right angle with respect to one another in order to engage the exteriorly presented walls of the vehicle or other movable object at a corner thereof. Moreover, the exterior walls of each of the sections are tapered inwardly from the connected ends to the opposite and outer ends so that shear forces applied to one or both of these exterior walls will not pry the bumper from a fixed and secured position on a corner of the movable object.

The corner bumper of the invention is further provided with fastening means, such as recesses to receive screws, bolts or other fasteners on these elongate sections and thus allow the sections to be secured to the movable object.

In a more preferred embodiment, the invention comprises a top wall which extends over portions of the first and second elongate sections. This top wall is actually in the form of a lip on each of these sections and the two lips are also integrally connected at their ends common to the ends of the two elongate sections. The lips, in combination, form this top wall which is sized to engage a top wall portion of a movable vehicle.

The interior surface of the top wall is also generally perpendicularly arranged with respect to the first and second interiorly presented walls. In this way, a true interior generally right angle wall structure is formed on the corner bumper in order to fit easily and conveniently on a rectangularly shaped corner portion of a truck or other vehicle or other movable object.

Inasmuch as any impact with the exteriorly presented first and second walls of the corner bumper is likely to occur near the joined ends of the elongate sections at the corner portion, shearing action is relatively unlikely inasmuch as the corner bumper is tapered toward thin outer edges. If the shearing force would occur near an edge, it is likely to miss the edge, which is relatively thin, as aforesaid. However, if the shearing action occurs in an opposite direction, again the exteriorly presented side walls, they are tapered so as to preclude a shearing of the corner bumper from a secured position on a movable object.

The present invention also provides a generally solid interior core extending between the first interiorly presented side wall and the first exteriorly presented side wall. In like manner, a generally solid interior core exists between the second interiorly presented side wall and the second exteriorly presented side wall. A large number of openings are vertically formed within this inner core and, effectively in combination, form large voids or non-material area and also effectively form ribs therebetween. These ribs are open and in communication with an exterior portion, such as a bottom portion of the elongate sections and thus do not form sealed air pockets. In effect, and although these ribs are not formed with straight walls, they generally extend between the exterior and interior walls of each of the elongate sections.

The ribs which exist between the exteriorly and interiorly presented walls are generally of proper size and thickness so as to be partially collapsible to absorb the force of an impact against the exteriorly presented wall of each elongate section. Thus, if an impact against the exteriorly presented wall of the corner bumper should occur, the openings will partially collapse allowing for an absorption of some of the force of the impact. In like manner, the ribs which are formed in the interior of the core will also to some extent compress thereby further enhancing the absorption of the force of impact.

The interior core is actually integral with the exteriorly and interiorly presented side walls. In like manner, the lips which form the top wall are also preferably integral with side walls so that the entire device can be formed as a unitary structure. The corner bumper is preferably formed of a relatively rigid but yet somewhat compressible vinyl material. However, the corner bumper could be formed of other materials which allow for some compressibility but yet which are relatively rigid and durable. One other suitable materials include, for example, secured grade of a polyurethane. In addition, other natural and synthetic rubber materials and rubber based materials can be used.

The present invention thereby provides a highly effective and uniquely designed corner bumper for use on a movable object to preclude damage from an impact at least to a stationary object and therefore fulfills all of the objects of the invention. One of the forms of the corner bumper of the present invention and a method of use therefor is hereinafter described in the following detailed description of the invention and illustrated in the accompanying drawings. However, it is to be understood that these drawings and the following detailed description are set forth only for purposes of illustrating the general principles of the invention and are not to be taken in a limiting sense.

BRIEF DESCRIPTION OF THE DRAWINGS

Having thus described the invention in general terms, reference will now be made to the accompanying drawings in which:

DETAILED DESCRIPTION OF A PREFERRED EMBODIMENT

Referring now in more detail and by reference characters to the drawings which illustrate one of the preferred embodiments of the present invention, C designates a corner bumper having a first elongate section 20 and a second elongate section 22.

Figure 1:
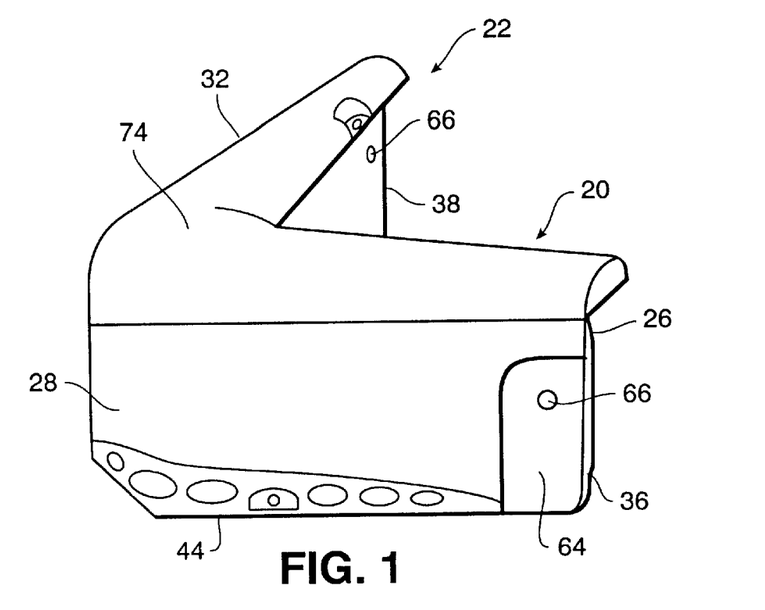
FIG. 1 is a perspective view showing the exterior portions of a corner bumpe Constructed in accordance with and embodied in the present invention.
Figure 2:
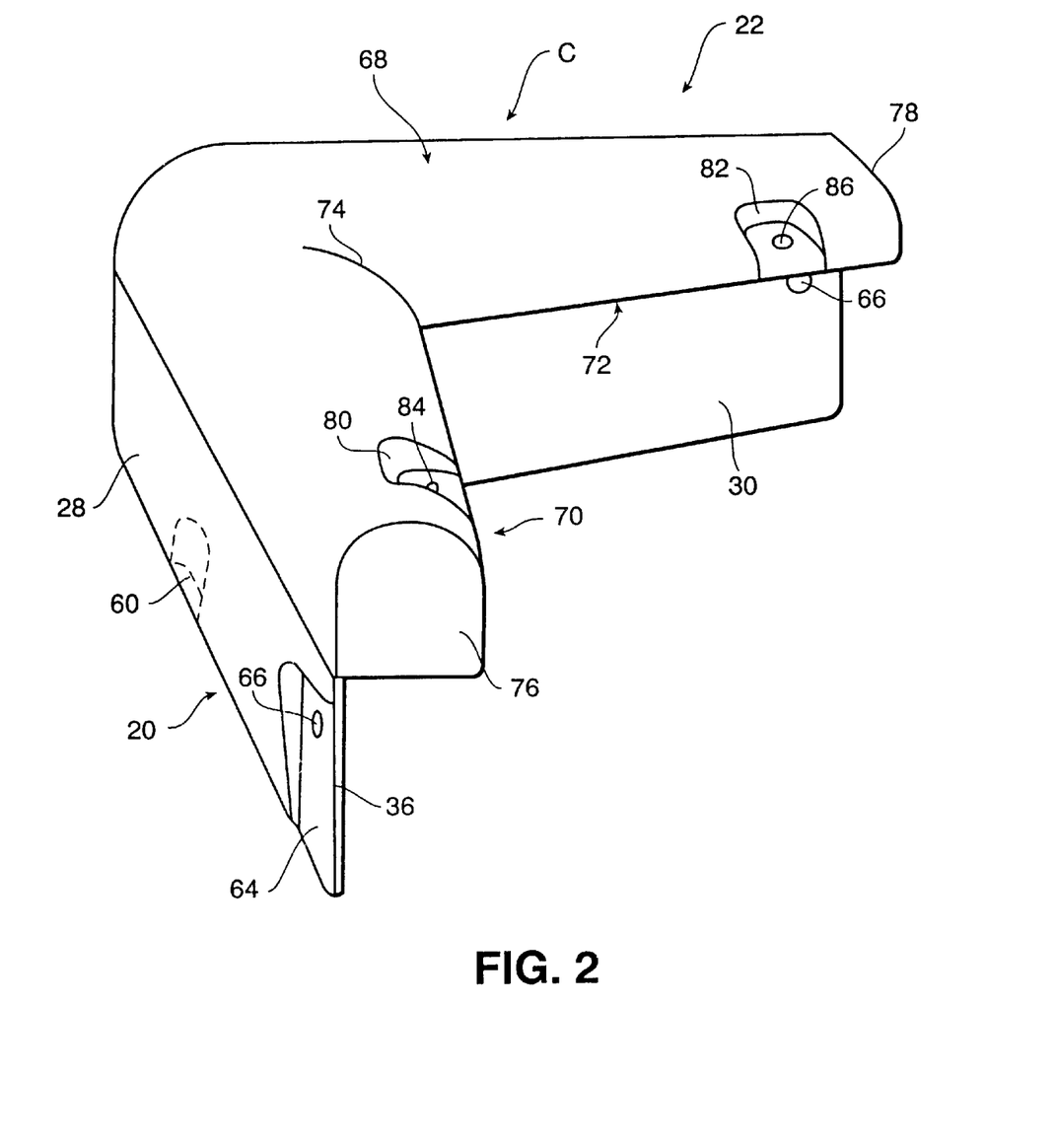
FIG. 2 is somewhat of an oblique perspective view taken from an end portion of one of the elongate sections of the corner bumper of the present invention.

Each of the elongate sections 20 and 22 are generally identical in construction and are connected at common ends, preferably at approximately right angles relative to one another, as best shown in FIGS. 1 and 2 of the drawings. Consequently, portions of the one elongate section 20 will be described in detail, with it being understood that such description is applicable to the generally perpendicularly arranged other elongate section 22.

Figures 4, 6:
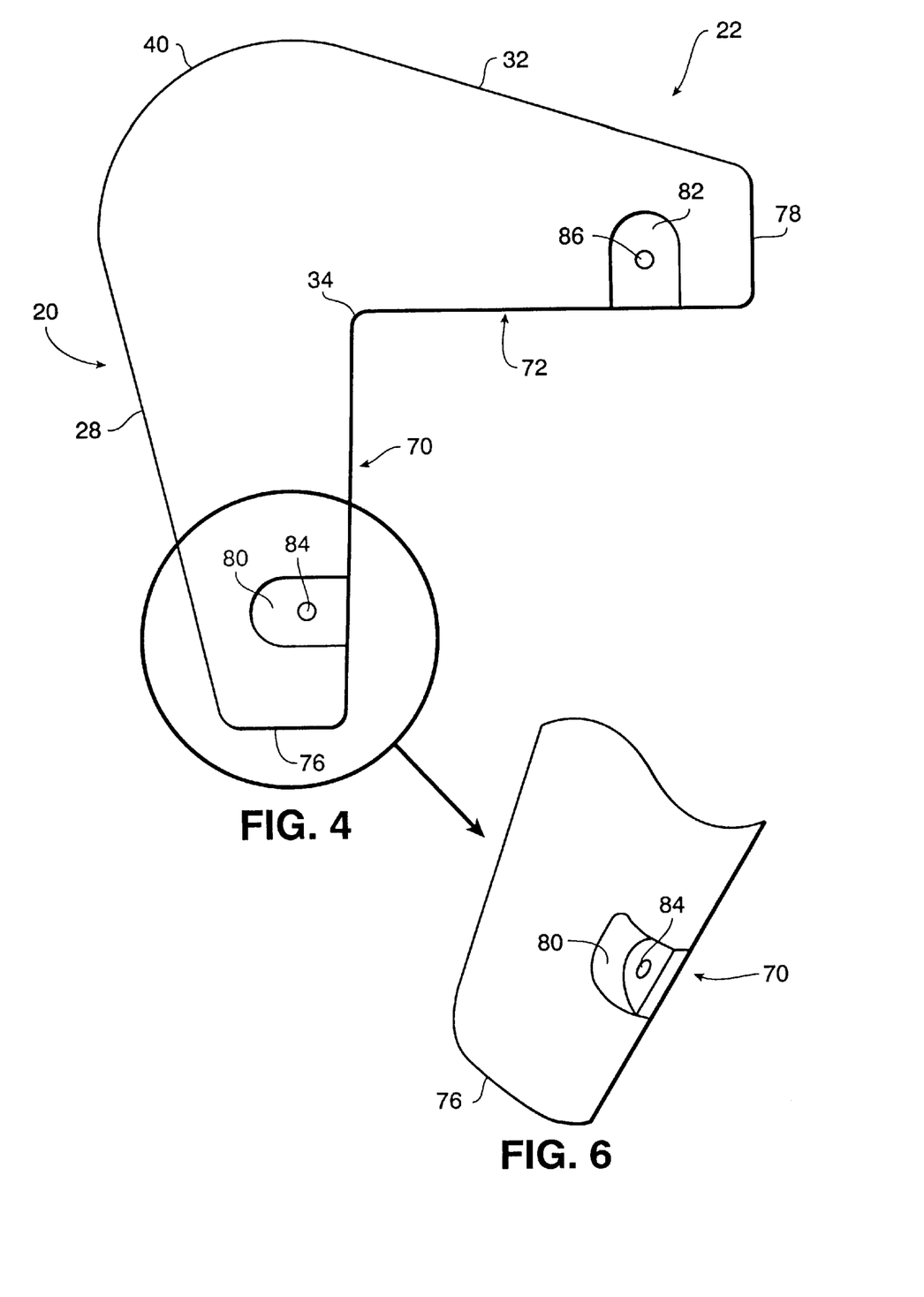
FIG. 4 is a top plan view of the corner bumper of the present invention.
FIG. 6 is an enlarged fragmentary perspective view showing a portion of the fastening area on FIG. 4 of the drawings.
Figure 5:
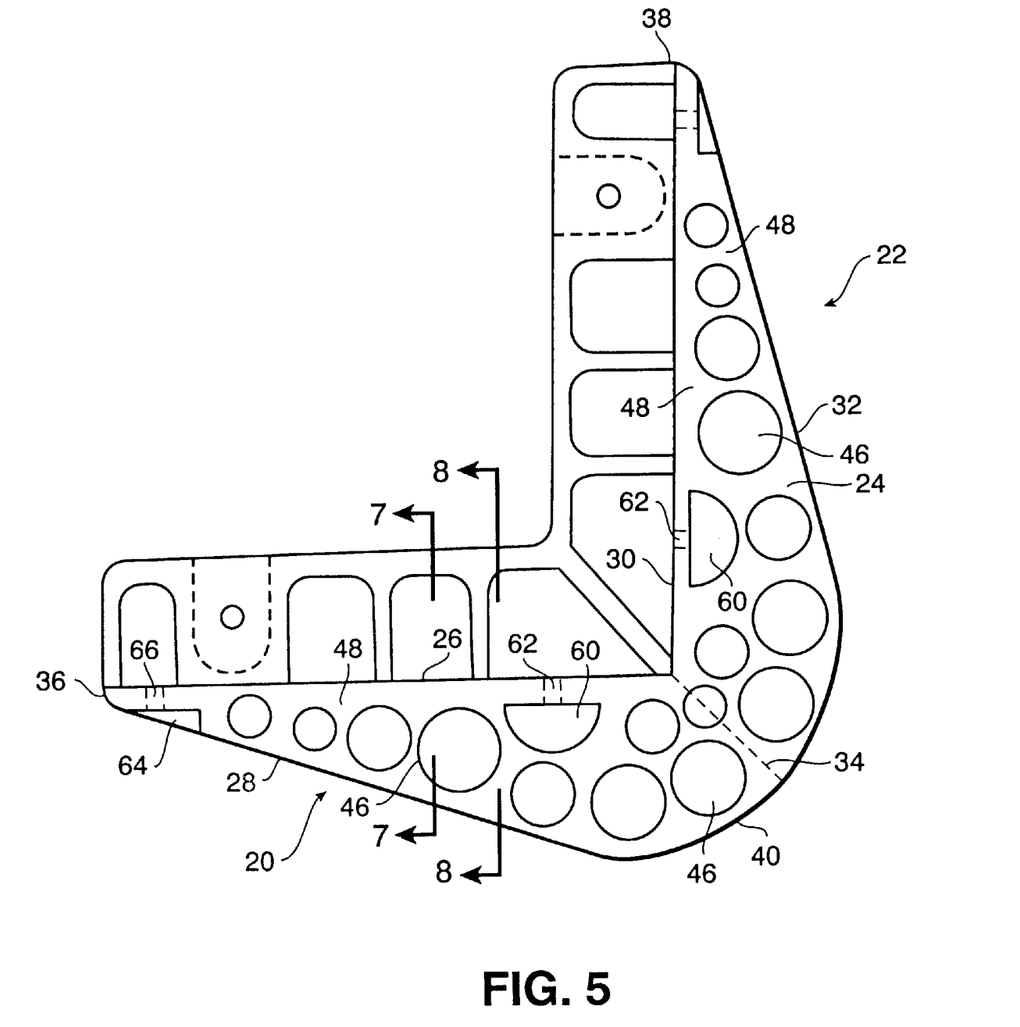
FIG. 5 is a bottom plan view of the corner bumper of the present invention.

The elongate 20 generally comprises an interior core 24 preferably formed of a relatively rigid yet compressible plastic or rubber material, such a vinyl, although any of the other previously identified materials could be employed for this purpose. The core integrally merges into an interiorly presented side wall 26, as shown in FIG. 5, and an exteriorly presented side wall 28, as best shown in FIG. 4. In like manner, the elongate section 22 has an interiorly presented side wall 30 and an exteriorly presented side wall 32, and the side wall 32 of which extends to a common corner or joinder region 34, as hereinafter described.

The side walls 26 and 28 of the elongate section 20 merge into a relatively thin free edge 36 at the right-hand end, reference being made to FIG. 1. In like manner, the interiorly presented wall 30 and the exteriorly presented wall 32 of the elongate section 22 also merge into a relatively thin outer or free vertical edge 38, also as best shown in FIG. 5 of the drawings. The thickness of the elongate sections 20 and 22 respectively increase almost uniformly from the free or unconnected ends to the joinder region 34, as is best illustrated by reference to FIG. 5 of the drawings. In other words, commencing from the relatively thin end 36 of the elongate section 20, the exteriorly presented wall 28 diverges away from the interiorly presented wall 26, as best shown in FIG. 5 of the drawings. In like manner, the exteriorly presented wall 32 of the elongate section 22 diverges outwardly from the interiorly presented wall 30, commencing from the relatively thin outer edge 38 almost until the region of the joinder 34. In this way, as the elongate sections increase from the outer ends, they progressively have a thicker cross-section.

The outer corner portion 40 where the exterior walls 28 and 32 integrally merge is arcuate in shape as best illustrated in FIGS. 4 and 5 of the drawings. In this way and in accordance with the construction as shown, it can be seen that impact with the outer edges 36 and 38 is relatively unlikely since they are relatively thin. Although impact against the side walls 28 and 32 can occur, if the movable object is moving forwardly, bumpers on a forwardly facing portion of the object will be impacted on the side walls 28 and 32, and not the outer ends 36 and 38. If the movable object is moving rearwardly as, for example, a truck backing up, the side walls or the corners of rearwardly facing bumpers will be impacted and not the free edges. Although impact can occur in the direction of the ends 36 and 38, since these walls are tapered, as best show in FIG. 5, it can be seen that any shear force will be unlikely to cause a removal of the corner bumper from a secured position on a movable object.

By further reference to FIG. 5 of the drawings, it can be seen that each of the exterior side wall surface 28 and 32 also taper inwardly toward the respective interiorly presented side wall surface 26 and 30, respectively, in the regions of their lower ends 44. In this way, there is, again, a reduced likelihood of causing a shearing action if a force of an impact should engage the corner bumper at any one of the lower edges.

Figure 3:
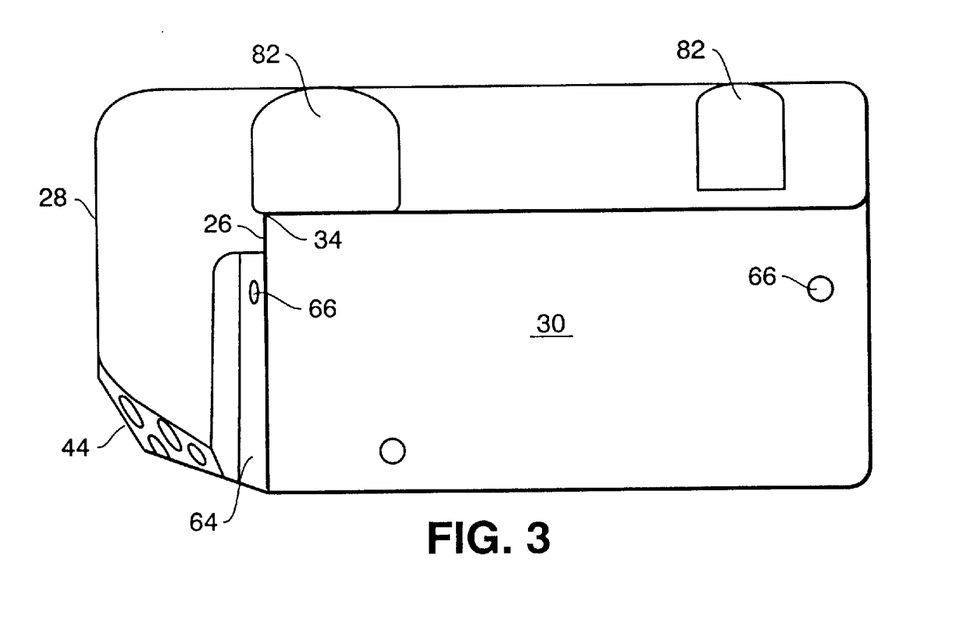
FIG. 3 is a side elevational view of one of the elongate sections of the corner bumper of the present invention.

The interior core 24 of each of the elongate sections 20 and 22 are also provided with a large number of vertically arranged openings or channels, as best shown in FIG. 5 of the drawings. Some of those openings terminate in the lower corner regions 44 as shown in FIGS. 1 and 3 of the drawings. Moreover, each of these openings 46 are generally circularly shaped, although other shaped openings could be employed, if desired. Moreover, it can be seen that the regions existing between each of the openings 46 form ribs 48. These ribs 48 are not necessarily of linear side walls, although the openings 46 do effectively form ribs 48 which extend between the respective interiorly presented walls and the exteriorly presented walls.

Figures 7, 8:
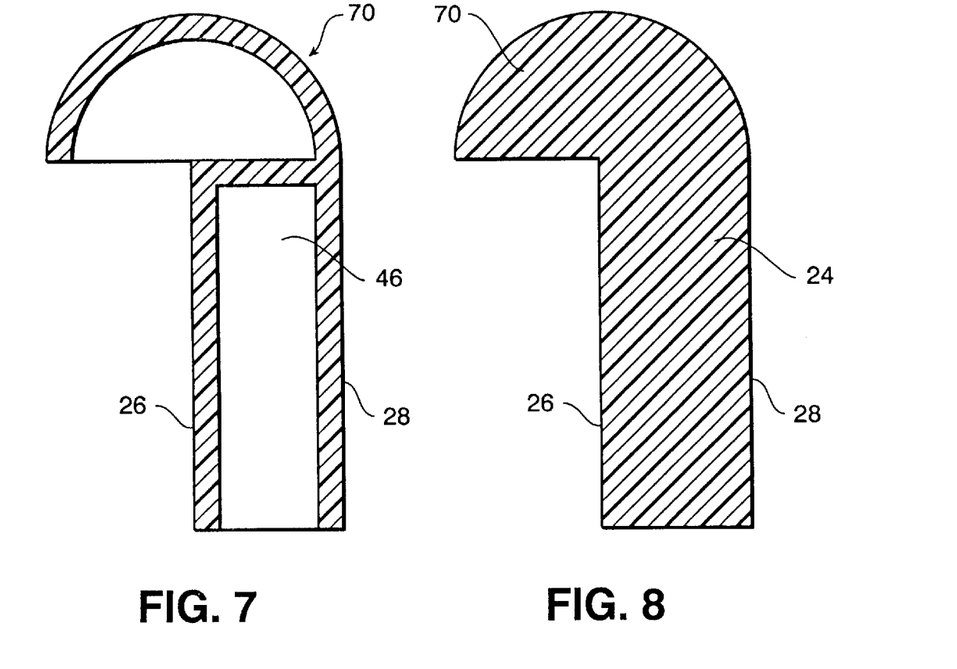
FIG. 7 is a vertical sectional view substantially taken along line 7—7 of FIG. 5.
FIG. 8 is a vertical sectional view taken substantially along line 8—8 of FIG. 5.
Figure 9:
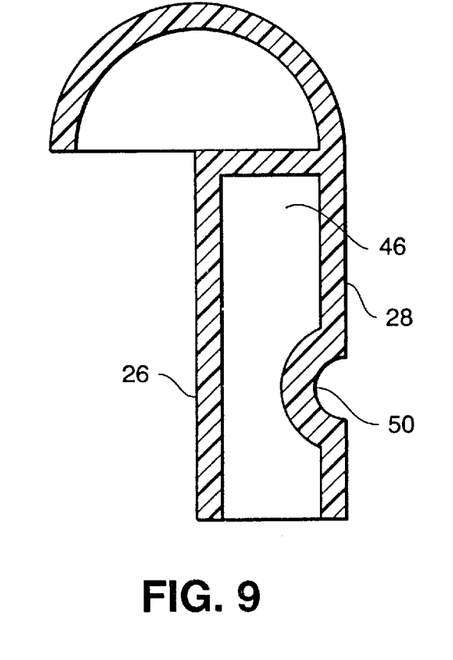
FIG. 9, is a vertical sectional view similar to FIG. 7, but showing deflection of a portion of the side wall of the corner bumper upon an impact.
Figure 10:
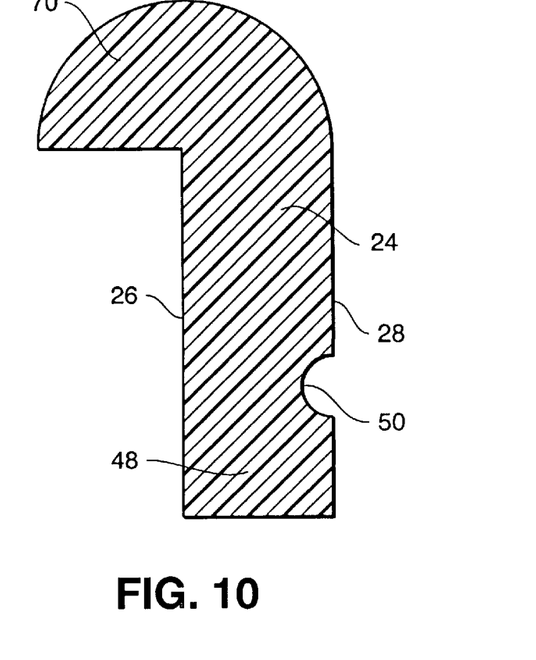
FIG. 10 is a vertical sectional view, similar to FIG. 7, and showing deflection of a portion of the side wall upon an impact.
Figure 11:
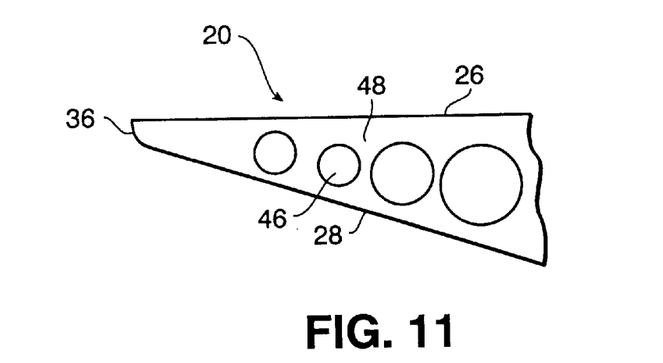
FIG. 11 is an enlarged fragmentary bottom plan view of a portion of one of the elongate sections of the corner bumper.
Figure 12:
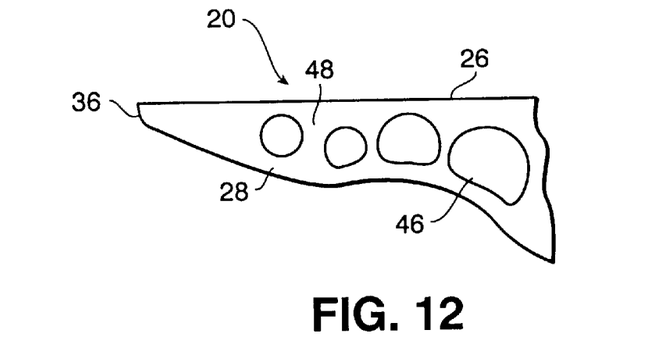
FIG. 12 is an fragmentary bottom plan view, similar to FIG. 11, and showing collapsing of a portion of the structure upon impact.

These openings or channels effective open at their lower ends so that the openings or channels are constantly air filled at ambient pressure, as best shown in FIGS. 7 and 8 of the drawings. Nevertheless, upon an impact, as shown in FIGS. 9 and 10, it can be seen that the openings 46 will compress in the region of the impact, as shown. Since the material of construction of the core is relatively elastic, these regions of impact 50 will return to their original undeflected position as shown in FIGS. 7 and 9 upon removal of the force resulting from the impact.

In addition to the foregoing, the core material is chosen so that it will also have some degree of resiliency. Thus, even in the regions where there are no openings 46, as shown in FIGS. 8 and 10, the region of impact 50 in FIG. 10 will generally return to its original shape, as shown in FIG. 8 after the force which caused the impact has been removed. Moreover, and by reference to FIG. 5, it can be seen that there are several openings in the relatively thick portions of the elongate section extending between the exterior and interior walls.

The grouping of a large number of openings in the region of joinder 34 has also been found to be preferable, since this is the region which typically receives the greatest impact. Again, the density of the hole pattern can vary depending upon the materials of construction which are employed and the intended use of the corner bumper. Further, and as indicated above, the shape of the openings can also vary and are not necessarily limited to circular openings, but they could be triangular, rectangular, etc.

The elongate sections 20 and 22 are each provided, adjacent their lower ends, with recesses 60 and aligned fastener receiving holes 62, which are sized to receive conventional fasteners, such as sheet metal screws or the like. In this way, the elongate sections can be secured to a movable object such as a truck trailer. In addition, the elongate sections 20 and 22 are each provided with additional end recesses 64 and connecting fastener receiving holes 66 for also receiving fasteners to thereby secure the corner bumper to a movable object. It should be understood, however, in connection with the present invention that it is also possible to locate the recesses for receiving fasteners in different positions. It is also possible to either increase or reduce the number of fastener receiving recesses and also provide other means of securement.

The corner bumper C is also provided with a top wall 68 which is comprised of a top lip 70 extending inwardly from the elongate section 20 and a top lip 72 extending inwardly from the elongate section 22 and which are again integrally joined in a joinder region 74. The top wall 68 may be secured to the elongate sections 20 and 22 or they may be integral therewith. The top wall 68 is formed of the same material used in the formation of the elongate sections 20 and 22.

The lips 70 and 72 are each formed of a generally solid-core material and are not provided with openings in the same manner as the elongate sections 20 and 22. However, it should be understood that, if desired, the lips 70 and 72 could also be provided with holes in the same manner for purposes of collapsing in the event of an impact. However, it has been found that there is typically little likelihood of impact on the upper surface of the top wall 68 and that the material of construction is generally sufficient to compress and absorb the force of any impact.

The top wall 68 is somewhat hemispherically shaped although it increases from relatively wide transverse ends 76 and 78 to the region of joinder 74. The exterior margin of the top wall 68 also conforms to that of the upper margin on the exterior walls 28 and 32 of each of the elongate sections 20 and 22, respectively.

By further reference to FIG. 2, it can be seen that the lips 70 and 72 are each of a relatively thick cross-section, that is, from exterior wall to interior wall in the region of the joinder 74, and that there is a generally uniform but increasing divergence of the outer margins of the lips 70 and 72 as they progress from the respective ends 76 and 78 to the region of joinder 74.

The lips 70 and 72 are each provided with recesses 80 and 82, respectively, along their upper surfaces and communicating fastener receiving openings 84 and 86 to receive conventional fasteners, such as sheet metal screws (not shown). Again, and although only two such fastener receiving recesses have been shown, it should be understood that any number of desired recesses can be employed.

Figure 13:
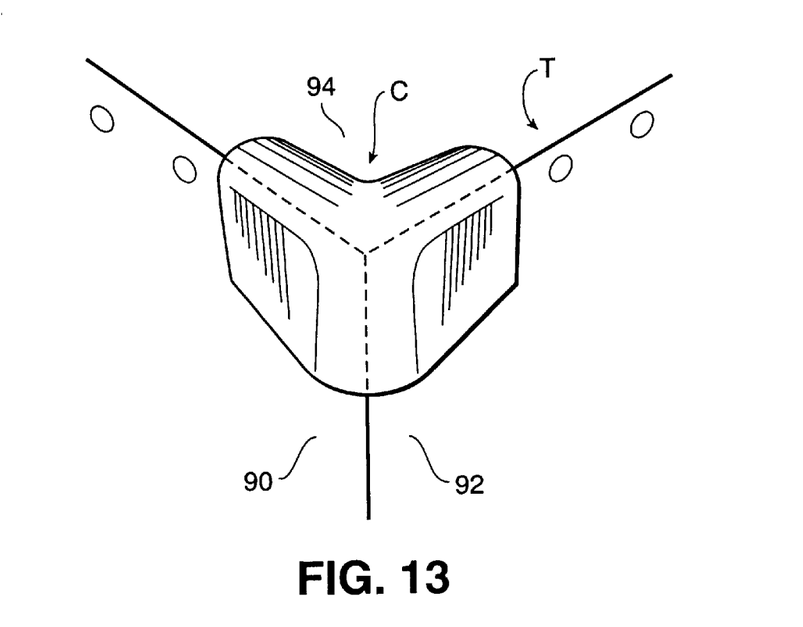
FIG. 13 is a fragmentary perspective view showing the mounting of a corner bumper of the invention on a corner portion of a movable object.

FIG. 13 illustrates the corner bumper C used on a movable object such as a truck T. In this case, the truck T has a pair of side walls 90 and 92 along with a top wall 94. The corner bumper fits precisely at that rectangularly shaped corner area due to the fact that the interior walls of the top wall 68 and the interior walls of the elongate section are all perpendicularly arranged. However, it should also be understood that for different types of geometric shaped corners, the corner bumper could be altered, as well.

Thus, there has been illustrated and described a unique and novel corner bumper for use on movable objects which has long-term life and rugged durability and which also fulfills all of the objects and advantages sought therefor. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

Having thus described the invention, what I desire to claim and secure by letters patent is:

1. A corner bumper for use on movable objects to prevent impact and resultant damage to a stationary structure, said corner bumper comprising:
   a) a first elongate section having a first interiorly presented wall and a first exteriorly presented wall;
   b) a second elongate section connected to an end of said first elongate section such that the first and second sections have opposite ends which are not connected to one another;
   c) said second elongate section having a second interiorly presented wall and a second exteriorly presented wall, said second interiorly presented wall being at an angle with respect to said first interiorly presented wall to engage the outer walls of a movable object;
   d) an interior core material extending between the interiorly and exteriorly presented walls of each elongate section; and
   e) being formed a plurality of openings in said core material and being of such size and spacing relative to one another to form a plurality of ribs from the interior core material extending between the interiorly and exteriorly presented walls of each elongate section, said openings being opened to the exterior of said corner bumper so as to be in communication with the ambient environment surrounding the corner bumper, said openings being partially collapsible, said ribs being of such size and thickness as to be partially compressible and displacable to absorb the force of an impact against the exteriorly presented wall of each elongate section.

2. The corner bumper of claim 1 further characterized in that a top wall extends over a portion of said first and second elongate sections and is sized to engage a top wall portion of movable object.

3. The corner bumper of claim 2 further characterized in that said top wall is comprised of first and second lip sections which are connected together at ends common to the connected ends of the exteriorly and interiorly presented walls and are of greater cross-sectional thickness in regions where the lips are connected to the respective elongate sections.

4. The corner bumper of claim 1 further characterized in that the first and second interiorly presented walls are located at approximately right angles to one another.

5. The corner bumper of claim 1 further characterized in that said first and second elongate sections are generally symmetrical to one another and that the connection of the first and second elongate sections is an integral connection.

6. The corner bumper of claim 1 further characterized in that said second interiorly presented wall being at an angle with respect to said first interiorly presented wall to engage the outer walls of a movable object and the exteriorly presented walls of each section being tapered inwardly from the connected ends to the opposite ends so that a shear force applied to one or both of the exteriorly presented walls will not force the corner bumper from a fixed and secured position on a movable object.

7. The corner bumper of claim 6 further characterized in that the distance between the exteriorly presented walls increases from the opposite ends to the ends where the elongate sections are connected together.

8. The corner bumper of claim 7 further characterized in that fastening means is provided on each of said elongate sections to allow those sections to be secured to a movable object.

9. A corner bumper for use on movable objects to prevent impact and resultant damage to a stationary structure, said corner bumper comprising:
   a) a first elongate section having a first interiorly presented wall and a first exteriorly presented wall;
   b) a second elongate section having an inner connecting end connected to an inner connecting end of said first elongate section such that the first and second sections have inner connected ends and outer opposite ends which are not connected to one another;
   c) said second elongate section having a second interiorly presented wall and a second exteriorly presented wall, said second interiorly presented wall being at an angle with respect to said first interiorly presented wall to engage the outer walls of a movable object and the exteriorly presented walls of each section being continuously and uniformly tapered inwardly from the connected ends to the opposite and outer ends, the outer ends of the sections where the interiorly presented walls and exteriorly presents walls meet forming a relatively thin edge, such that the remaining portions of each elongate section having progressively greater cross-sectional thickness so that shear force applied to one or both of the exteriorly presented walls will not force the corner bumper from a fixed and secured position on a movable object;
   d) an interior core material extending between the interiorly and exteriorly presented walls of each elongate section;
   e) being formed a plurality of openings in said core material and being of such size and spacing relative to one another to form a plurality of ribs from the interior core material extending between the interiorly and exteriorly presented walls of each elongate section, said openings being opened to the exterior of said corner bumper so as to be in communication with the ambient environment surrounding the corner bumper, said openings being partially collapsible, said ribs being of such size and thickness as to be partially compressible and displacable to absorb the force of an impact against the exteriorly presented wall of each elongate section; and
   f) a top wall extending over a portion of said first and second elongate sections and being sized to engage a top wall portion of movable object.

10. The corner bumper of claim 9 further characterized in that the first and second interiorly presented walls are located at approximately right angles to one another.

11. The corner bumper of claim 10 further characterized in that said top wall is comprised of fist and second lip sections which are connected together at ends common to the connected ends of the exteriorly and interiorly presented walls and are of greater cross-sectional thickness in regions where the lips are connected to the respective elongate sections.

12. A corner bumper for use on movable objects to prevent impact and resultant damage to a stationary structure, said corner bumper comprising:
   a) a first elongate section having a first interiorly presented wall and a first exteriorly presented wall;
   b) a second elongate section having an inner connecting end connected to an inner connecting end of said first elongate section such that the first and second sections have inner connected ends and outer opposite ends which are not connected to one another;
   c) said second elongate section having a second interiorly presented wall and a second exteriorly presented wall, said second interiorly presented wall being at an angle with respect to said first interiorly presented wall to engage and allow for securement to the outer walls of a movable object and the exteriorly presented walls of each section being tapered inwardly from the connected ends to the opposite ends so that a shear force applied to one or both of the exteriorly presented walls will not force the corner bumper from a fixed and secured position on a movable object;

d) a partially collapsible and resilient core material extending between the interiorly and exteriorly presented walls with a large number of relatively small openings relative to the size of the elongate sections extending throughout each of the elongate sections; and e) a plurality of ribbed portions formed from the remaining core material in each of the elongate sections extending between said interiorly and exteriorly presented walls of each elongate section and being partially compressible and displacable upon an impact to thereby absorb the force of an impact.

13. A corner bumper for use on movable objects to prevent impact and resultant damage to a stationary structure, said corner bumper comprising:

a) a first elongate section having a first interiorly presented wall and a first exteriorly presented wall;

b) a second elongate section connected to an end of said first elongate section such that the first and second sections have opposite ends which are not connected to one another;

c) said second elongate section having a second interiorly presented wall and a second exteriorly presented wall, said second interiorly presented wall being at an angle with respect to said first interiorly presented wall to engage and allow for securement to the outer walls of a movable object and the exteriorly presented walls of each section being tapered inwardly from the connected ends to the opposite ends so that a shear force applied to one or both of the exteriorly presented walls will not force the corner bumper from a fixed and secured position on a movable object; and d) said first interiorly presented wall and first exteriorly presented wall being tapered relative to one another to merge into a relatively thin end section and that said second interiorly presented wall and said second exteriorly presented wall are tapered relative to one another to merge into a relatively thin end section so as to reduce the possibility of direct engagement with a stationary structure; and e) interior core material extending between the exteriorly and interiorly presented walls of each elongate section and openings exist in said core material and forming ribs between the interiorly and exteriorly presented walls of each elongate section, said ribs being of such thickness so as to be at least partially collapsible to absorb the force of an impact.

14. A corner bumper for use on movable objects to prevent impact and resultant damage to a stationary structure, said corner bumper comprising:

a) a first elongate section having a first interiorly presented wall and a first exteriorly presented wall;

b) a second elongate section connected to an end of said first elongate section such that the first and second sections have opposite ends which are not connected to one another;

c) said second elongate section having a second interiorly presented wall and a second exteriorly presented wall, said second interiorly presented wall being at an angle with respect to said first interiorly presented wall to engage and allow for securement to the outer walls of a movable object and the exteriorly presented walls of each section being tapered inwardly from the connected ends to the opposite ends so that a shear force applied to one or both of the exteriorly presented walls will not force the corner bumper from a fixed and secured position on a movable object; and d) an interior core material extends between the exteriorly and interiorly presented walls of each elongate section and openings exist in said core material and form ribs between the interiorly and exteriorly presented walls of each elongate section, said ribs being of such thickness so as to be at least partially collapsable so as to absorb the force of an impact.

15. A corner bumper for use on movable objects to prevent impact and resultant damage to a stationary structure, said corner bumper comprising:

a) a first elongate section having a first interiorly presented wall and a first exteriorly presented wall;

b) a second elongate section connected to an end of said first elongate section such that the first and second sections have opposite ends which are not connected to one another;

c) said second elongate section having a second interiorly presented wall and a second exteriorly presented wall, said second interiorly presented wall being at an angle with respect to said first interiorly presented wall to engage the outer walls of a movable object;

d) an interior core material extending between the interiorly and exteriorly presented walls of each elongate section; and e) a plurality of openings being formed in said core material and which openings are downwardly and outwardly opening to prevent collection of and allow draining of water, said openings being of such size and spacing relative to one another to form a plurality of ribs from the remaining core material extending between the interiorly and exteriorly presented walls of each elongate section, said ribs being of such size and thickness as to be partially collapsible to absorb the force of an impact against the exteriorly presented wall of each elongate section.

16. A corner bumper for use on movable objects to prevent impact and resultant damage to a stationary structure, said corner bumper comprising:

a) a first elongate section having a first interiorly presented wall and a first exteriorly presented wall;

b) a second elongate section connected to an end of said first elongate section such that the first and second sections have opposite ends which are not connected to one another;

c) said second elongate section having a second interiorly presented wall and a second exteriorly presented wall, said second interiorly presented wall being at an angle with respect to said first interiorly presented wall to engage the outer walls of a movable object;

d) an interior core material extending between the interiorly and exteriorly presented walls of each elongate section;

e) a plurality of openings formed in said core material and said openings being of such size and spacing relative to one another to form a plurality of ribs extending between the interiorly and exteriorly presented walls of each elongate section, said ribs being of such size and thickness as to be partially collapsible to absorb the force of an impact against the exteriorly presented wall of each elongate section; and f) a top wall extending over a portion of said first and second elongate sections and being sized to engage a top wall portion of a moveable object, said top wall being comprised of first and second lip sections which are connected together at ends common to the connected ends of the exteriorly and interiorly presented walls and being of greater cross-sectional thickness in regions where the lips are connected to the respective elongate sections.

17. The corner bumper of claim 16 further characterized in that said second interiorly presented wall being at an angle with respect to said first interiorly presented wall to engage the outer walls of a movable object and the exteriorly presented walls of each section being tapered inwardly from the connected ends to the opposite ends so that a shear force applied to one or both of the exteriorly presented walls will not force the corner bumper from a fixed and secured position on a movable object.

18. The corner bumper of claim 16 further characterized in that the distance between the exteriorly presented walls and interiorly presented walls progressively increases from the opposite ends to the ends where the elongate sections are connected together.

19. A corner bumper for use on movable objects to prevent impact and resultant damage to a stationary structure, said corner bumper comprising:
    a) a first elongate section having a first interiorly presented wall and a first exteriorly presented wall;
    b) a second elongate section connected to an end of said first elongate section such that the first and second sections have opposite ends which are not connected to one another;
    c) said second elongate section having a second interiorly presented wall and a second exteriorly presented wall, said second interiorly presented wall being at an angle with respect to said first interiorly presented wall to engage the outer walls of a movable object and the exteriorly presented walls of each section being tapered inwardly from the connected ends to the opposite ends so that shear force applied to one or both of the exteriorly presented walls will not force the corner bumper from a fixed and secured position on a movable object;
    d) an interior core material extending between the interiorly and exteriorly presented walls of each elongate section;
    e) a plurality of openings formed in said core material and said opening being of such size and spacing relative to one another to form a plurality of ribs extending between the interiorly and exteriorly presented walls of each elongate section, said ribs being of such size and thickness as to be partially collapsible to absorb the force of an impact against the exteriorly presented wall of each elongate section; and
    f) a top wall extending over a portion of said first and second elongate sections and being sized to engage a top wall portion of movable object, said top wall being comprised of first and second lip sections which are connected together at ends common to the connected ends of the exteriorly and interiorly presented walls and which are of greater cross-sectional thickness in regions where the lips are connected to the respective elongate sections.

20. A corner bumper for use on movable objects to prevent impact and resultant damage to a stationary structure, said corner bumper comprising:
    a) a first elongate section having a first interiorly presented wall and a first exteriorly presented wall;
    b) a second elongate section connected to an end of said first elongate section such that the first and second sections have outer opposite ends which are not connected to one another;
    c) said second elongate section having a second interiorly presented wall and a second exteriorly presented wall, said second interiorly presented wall being at an angle with respect to said first interiorly presented wall to engage and allow for securement to the outer walls of a movable object;
    d) a plurality of ribbed portions extending between said interiorly and exteriorly presented walls of each elongate sections; and
    e) the exteriorly presented walls of each section being continuously and uniformly tapered inwardly toward the interiorly presented walls of the respective sections from the connected ends to the outer opposite ends so that there is a generally uniform reduction in thickness of the respective elongate sections from the connected ends to the outer ends and so that the connected ends have a greater cross-sectional thickness than the opposite ends, and the outer opposite ends further merging into relatively thin end elements which are sufficiently thin such that a shear force applied to one or both of the exteriorly presented walls will not force the corner bumper from a fixed and secured position on a movable object.

21. A corner bumper for use on movable objects to prevent impact and resultant damage to a stationary structure, said corner bumper comprising:
    a) a first elongate section having a first interiorly presented wall and a first exteriorly presented wall;
    b) a second elongate section connected to an end of said first elongate section such that the first and second sections have outer opposite ends which are not connected to one another;
    c) said second elongate section having a second interiorly presented wall and a second exteriorly presented wall, said second interiorly presented wall being at an angle with respect to said first interiorly presented wall to engage and allow for securement to the outer walls of a movable object;
    d) the exteriorly presented walls of each section being continuously and uniformly tapered inwardly toward the interiorly presented walls of the respective sections from the connected ends to the outer opposite ends so that there is a generally uniform reduction in thickness of the respective elongate sections from the connected ends to the outer ends and so that the connected ends have a greater cross-sectional thickness than the opposite ends, and the outer opposite ends further merging into relatively thin end elements which are sufficiently thin such that a shear force applied to one or both of the exteriorly presented walls will not force the corner bumper from a fixed and secured position on a movable object; and
    e) an interior core material extending between the exteriorly and interiorly presented walls of each elongate section with openings existing in said core material and forming ribs between the interiorly and exteriorly presented walls of each elongate section from the remaining core material, said ribs being of such thickness so as to be at least partially collapsible so as to absorb the force of an impact.

* * * * *